(12) United States Patent
Komiya et al.

(10) Patent No.: US 7,617,669 B1
(45) Date of Patent: Nov. 17, 2009

(54) CABLE PROTECTION AND GUIDE DEVICE

(75) Inventors: Shoichiro Komiya, Osaka (JP); Kouichi Kaihotsu, Osaka (JP); Takayuki Matsuda, Osaka (JP)

(73) Assignee: Tsubakitmoto Co., Osaka (JP)

( * ) Notice: Subject to any disclaimer, the term of this patent is extended or adjusted under 35 U.S.C. 154(b) by 0 days.

(21) Appl. No.: 12/371,614

(22) Filed: Feb. 15, 2009

(30) Foreign Application Priority Data

Apr. 24, 2008 (JP) .............................. 2008-114089

(51) Int. Cl.
*F16G 13/16* (2006.01)
(52) U.S. Cl. ............................. 59/78.1; 59/900; 248/49; 248/51
(58) Field of Classification Search ............... 59/78, 59/78.1, 900; 248/49, 51
See application file for complete search history.

(56) References Cited

U.S. PATENT DOCUMENTS 4,800,714 A * 1/1989 Moritz ........................ 248/49
6,107,565 A * 8/2000 O'Rourke .................... 59/78.1
7,047,720 B2 * 5/2006 Ikeda et al. .................. 59/78.1
7,451,590 B2 * 11/2008 Blase ........................... 248/51

FOREIGN PATENT DOCUMENTS

JP    2005-147293    6/2005

* cited by examiner

*Primary Examiner*—David B Jones
(74) *Attorney, Agent, or Firm*—Woodling, Krost and Rust

(57) ABSTRACT

A cable protection and guide device in which disengagement of a connection pin from a connecting pin hole is prevented. A cable protection and guide device in which a number of link frame bodies are flexibly and sequentially connected to each other such that a connecting pin of a preceding link plate is inserted into a connecting pin hole of the subsequent link plates. Cutout opening portions reside in the link plates. Connecting pins are inserted into the connecting pin hole 114. The connecting pins pass through a cutout portion of the side plate. Cutout opening portions in the link plates communicate with the connecting pin holes. A filling member integrally formed in the lid-shaped connecting arm seals against the connecting pin.

4 Claims, 10 Drawing Sheets

CABLE PROTECTION AND GUIDE DEVICE

This application claims priority to Japanese patent application serial no. 2008-114089 filed Apr. 24, 2008. The priority document will be retrieved electronically under cooperative action between the United States Patent Office and the Japanese Patent Office.

TECHNICAL FIELD

The present invention is a cable protection and guide device which safely and reliably protects and guides a flexible cable, such as an electric cable, a hydraulic hose, a pneumatic hose, or an optical fiber cable. The cable protection and guide device is used in industrial machines such as a machine tool, electronic equipment, an industrial robot, or a transfer machine. The cable protection and guide device communicates energy or signals between fixed and movable portions of the machine.

BACKGROUND TECHNOLOGY

A cable protection and guide device protects and guides one or more cables. The device includes a number of rectangular link frame bodies. Each rectangular link frame bodies includes a pair of right and left spaced link plates and connecting plates laterally provided on a flexional inner circumferential side and a flexional outer circumferential side of the link plates. The connecting plates are flexibly connected to each other by connecting pins and connecting pin holes provided on the link plates. One or more cables are inserted through a cable accommodating space formed by the link frame bodies and the connecting plates. See Japanese Laid-Open Patent Publication No. 2005-147293, page 1, FIG. 1.

Problems to be Solved by the Invention

However, in the conventional cable protection and guide device, the inner width of the connecting pin hole side of a preceding link frame body is smaller than the outer width of the connecting pin side of the subsequent link frame body. The outer diameter of the connecting pin is larger than the inner diameter of the connecting pin hole and a large force is required to connect the preceding link frame body and the subsequent link frame body. Thus the conventional cable protection and guide device has many problems in that considerable labor is required to join the parts together. Additionally, the force required to connect the link frame bodies causes damage and breakage of the link frame bodies.

Further, when the cable protection and guide device is miniaturized, thickening of a plate of the link plate forming the link body or lengthening the connecting pin cannot be easily performed. Tensile strength and deflection rigidity cannot be sufficiently ensured because the plates and the connecting pins cannot be made thick enough.

Further, it is desired that the connecting pin hole is blindly formed and is sealed on an outer surface side of the link plate so that foreign substances such as dust not enter the connecting pin hole. Further, when the inner width of the link frame body is narrow and a small connecting pin hole is required, the connecting pin hole of the link plate cannot be formed in a blind hole because of the structure of the mold.

Accordingly, the object of the present invention is to solve the above-mentioned problems of the conventional device by providing a device in which disengagement of a connection pin from a connecting pin hole is prevented. The present invention provides a cable guide and protection device which includes link plates having excellent tensile strength and deflection rigidity.

Means for Solving the Problems

The invention solves the above-mentioned problems by providing a cable protection and guide device wherein a number of link frame bodies are employed. Each of the leak frame bodies includes a pair of right and left spaced link plates with an integrally molded bottom plate-shaped arm on a flexional inner circumferential side in a laterally bridged state. Each of the link frame bodies are flexibly and sequentially connected to each other such that a connecting pin of a preceding link plate is inserted into a connecting pin hole from a flexional outer circumferential side of the subsequent link plate. A cable is inserted into a cable accommodating space formed by a number of lid-shaped connecting arms each oppositely disposed to said bottom plate-shaped arm. The lid-shaped connecting arms are sequentially attached to a flexional outer circumferential side of the link plates in a laterally bridged state.

The connecting pin is inserted (fitted) into the connecting pin hole. The cutout opening portion communicates with the respective connecting pin hole. A filling member, which seals the connecting pin and cutout opening portion, is integrally formed on the lid-shaped connecting arm.

Further, the invention includes a connecting pin hole in the form of a blind hole sealed on an outer surface of the link plates. Put another way, the connecting pin hole is an aperture in the link plate which does not extend therethrough but rather terminates in the link plate.

Further, the invention includes a disengagement prevention flange portion which protrudes at a front end of the connecting pin. The disengagement prevention flange portion is engaged with a disengagement prevention groove portion circumferentially provided along the connecting pin hole.

EFFECTS OF THE INVENTION

The cable protection and guide device includes a number of link frame bodies each composed of a pair of right and left spaced link plates. Each link frame body includes an integrally molded bottom plate-shaped arm on a flexional inner circumferential side in a laterally bridged state. The link frame bodies are flexibly and sequentially connected to each other. A connecting pin of a preceding link plate is inserted into a connecting pin hole of a subsequent link plate from the flexional outer circumferential side.

A cable is inserted into a cable accommodating space. The cable accommodating space is formed by the link plates, the bottom plate-shaped arms, and the lid-shaped connecting arms. The lid-shaped connecting arms are arranged oppositely disposed to the bottom plate-shaped arms. The lid-shaped connecting arms are detachably and sequentially attached to a flexional outer circumferential side of the link plates in a laterally bridged state.

The connecting pin resides partially within the cutout opening portions. The connecting pin is inserted into the connecting pin hole formed in the link plate. The connecting pin hole communicates with the cutout opening portions of the link plate. A filling member, which seals the connecting pin and the cutout opening portion, is integrally formed on the lid-shaped connecting arm. The cutout opening portions are sealed by filling members of the lid-shaped connecting arms while the connecting pins are inserted into the connecting pin holes. For example, when the inner width of a preceding link plate having a connecting pin hole is smaller than the outer width of the adjacent subsequent link plate having a connecting pin, or even if the length of the connecting pin is too long, the effort is significantly reduced at the time of assembly of the link plates. The deformation of the assembly liable to occur in the link plate is avoided and the disengagement of the connecting pin and the connecting pin hole is prevented. Simply stated, the connecting pins are inserted into the cutout openings of the adjacent plate and the fact that the pins may be too long is not important because the pins are inserted from the outer circumferential portion of the link plates and then the filling member of the lid shaped connecting arm seals the connecting pins and the cutout opening of the link plate.

The structure just described accommodates miniaturized link frame bodies.

Alternatively, the connecting pin hole is a blind hole sealed on the outer surface side of the link plates. The entry of foreign substances such as dust into the connecting pin hole and the residence therein are blocked. Thus the connecting pin becomes rotatable in the connecting pin hole so that smooth flexional operation (bending) of both link frame bodies can be attained.

Alternatively, a disengagement prevention flange portion is protrudently provided at a front end of the connecting pin. The disengagement prevention flange portion is engaged with a disengagement prevention groove portion circumferentially provided along the connecting pin hole. A strong disengagement prevention mechanism is formed by the disengagement prevention flange portion and the disengagement prevention groove portion. Even if excessive tension and bending are generated in both link frame bodies, the disengagement of the connecting pin from the connecting pin hole can be completely prevented.

A number of link frame bodies are each composed of a pair of right and left spaced link plates with an integrally molded bottom plate-shaped arm on a flexional inner circumferential side in a laterally bridged state. The link frame bodies are flexibly and sequentially connected to each other by a connecting pin of a preceding link plate inserted into a connecting pin hole of the subsequent link plate. The connecting pin is inserted in a flexional outer circumferential side of the subsequent link plate. A cable is inserted into a cable accommodating space formed by a number of lid-shaped connecting arms each oppositely disposed to the bottom plate-shaped arm and the link plates. The lid-shaped connecting arms are detachably and sequentially attached to a flexional outer circumferential side of the link plates in a laterally bridged state. The link plates include cutout opening portions through which the connecting pin is inserted and fitted into the connecting pin hole. The cutout opening portions are formed on a flexional outer circumferential side of the link plate and receive the connecting pins. The connecting pins are inserted in the cutout portion of the link plate and are then inserted in the connecting pin holes. A filling member, which seals the connecting pin and the cutout opening portion, is integrally formed on the lid-shaped connecting arm. The structure prevents disengagement of the connecting pin from the connecting pin hole and excellent tensile strength and deflection rigidity are exhibited. The device is easy to assemble.

Glass fiber reinforced polyamide resin may be used in the cable protection and guide device of the present invention. Alternatively, polyacryl resin-, polyamide resin-, poly ester-based conductive resin materials, fatigue resistant synthetic resin materials and the like may be used.

If the cutout opening portion receives (from the flexional outer circumferential side of the link plate) a connecting pin which is inserted into the connecting pin hole, different embodiments of the link plates forming this link frame body may be adopted. For example, a rotation angle limiting stopper may be provided around the connecting pin and the connecting pin hole, and in that case, flexional noise at the time of the flexing operation is reduced.

Further, alternative embodiments of a lid-shaped connecting arm used in the cable protection and guide device of the present invention may be used if the lid-shaped connecting arm is detachably/attachably attached to a flexional outer circumferential side of the pair of right and left spaced link plates in a laterally bridged state. Similarly, alternative embodiments of the filling member may be used. The filling member is integrally molded with the lid-shaped connecting arm and seals the connecting pin inserted through the cutout opening portion. The connecting pin is prevented from disengaging the connecting pin hole. For example the lid-shaped arm may be used if it is attached by engaging with a flexional outer circumferential side of the link plates in a snap mechanism while sandwiching the link plates.

The intended use of the present invention is a cable protection and guide device as described herein. However, the basic technical idea can be of course applied to other technologies.

DESCRIPTION OF THE INVENTION

Example

A cable protection and guide device, which is an example of the present invention, will be described with reference to drawings hereinbelow.

Figure 1:
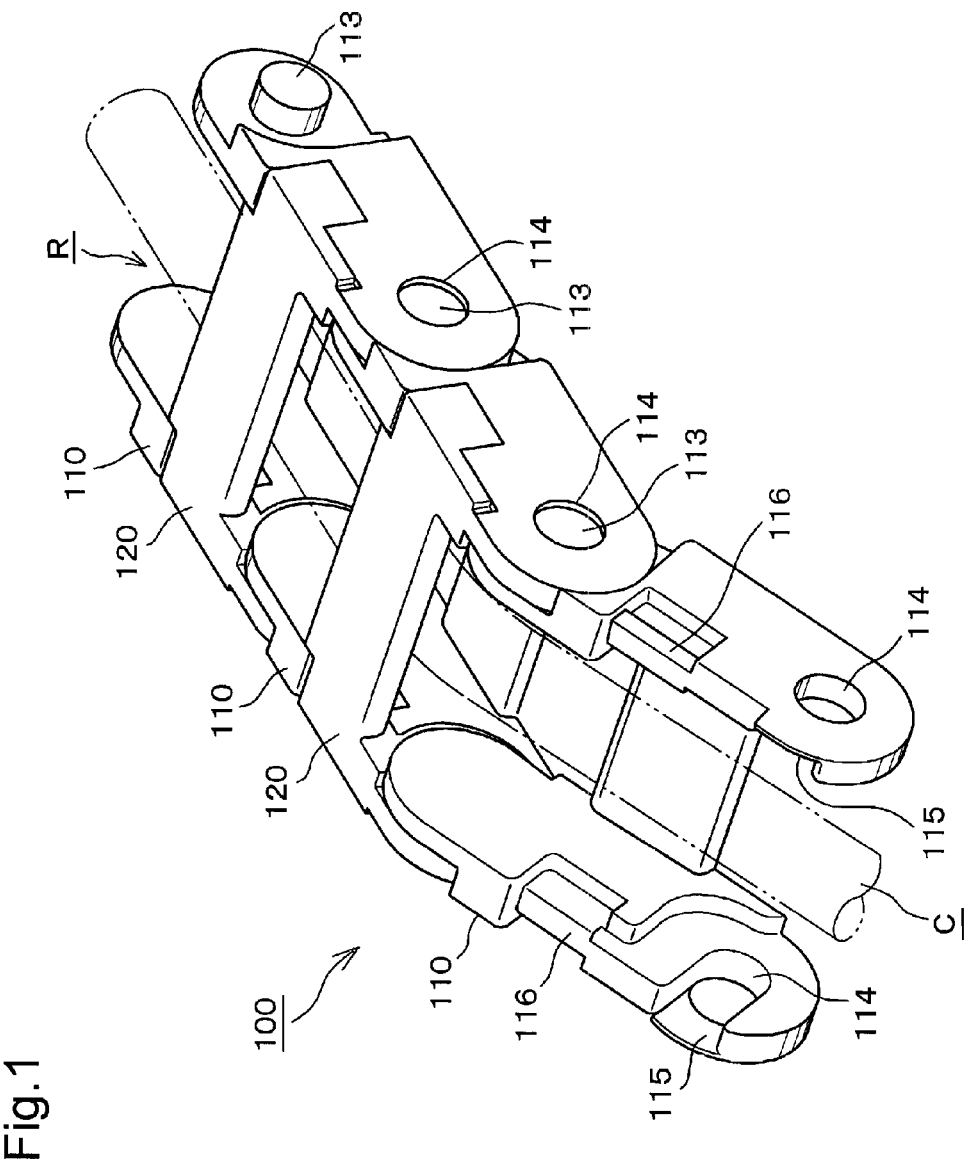
FIG. 1 is a perspective view of the cable protection and guide device, which is a first example of the present invention.
Figure 2:
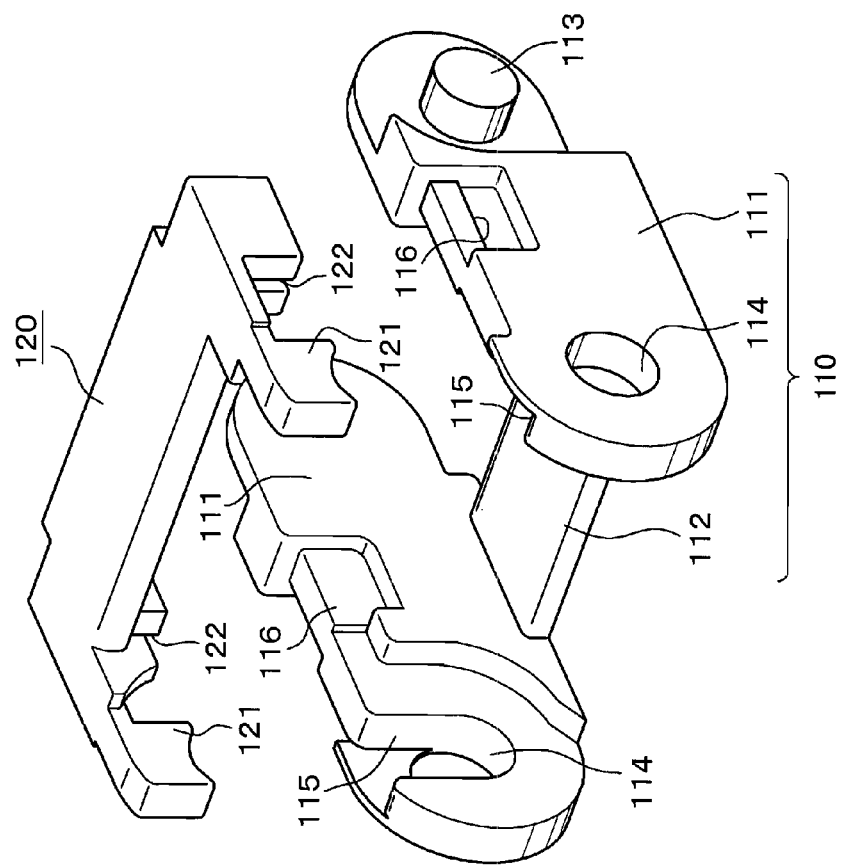
FIG. 2 is a perspective view of a link frame body and a lid-shaped connecting arm used in FIG. 1.
Figure 3:
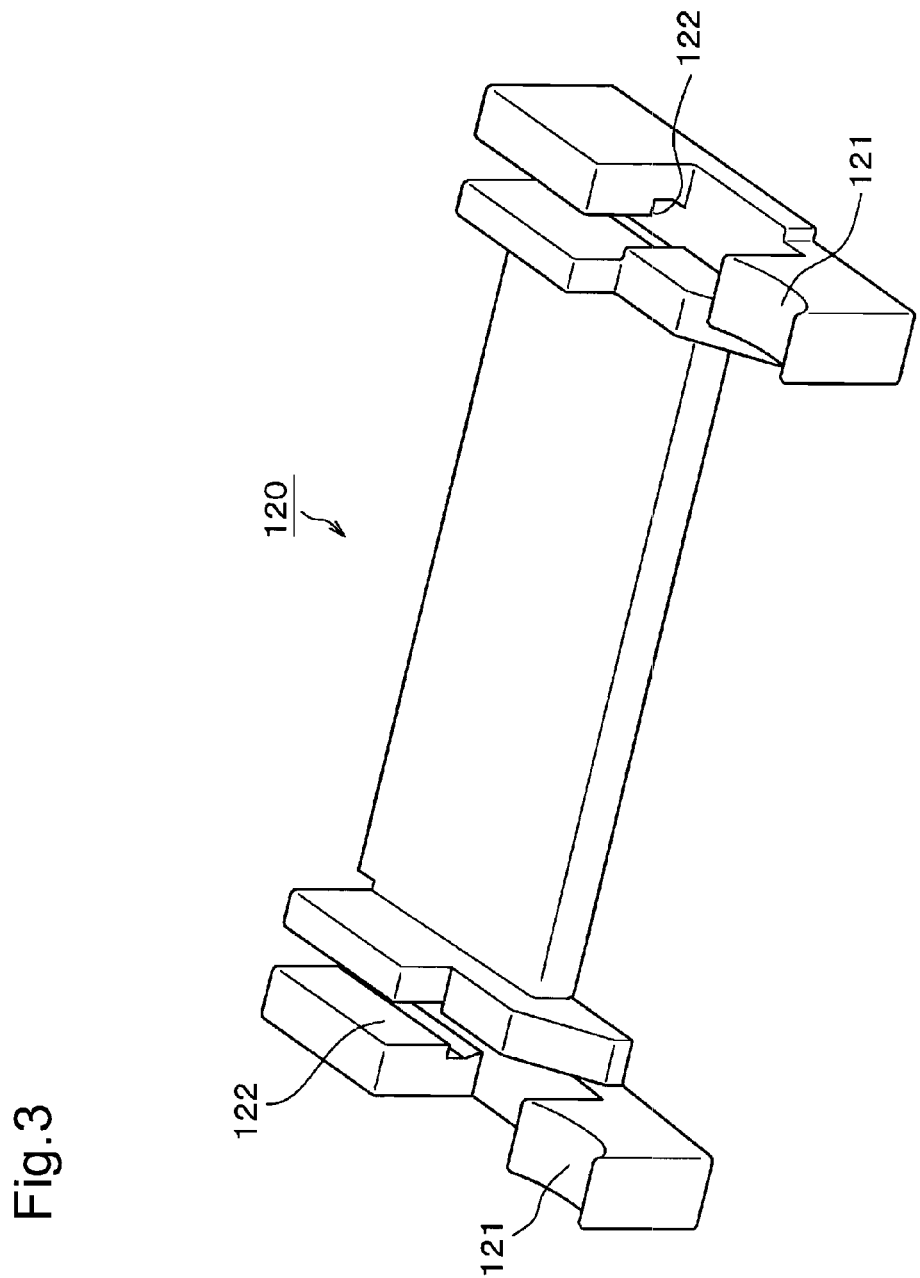
FIG. 3 is a perspective view of the lid-shaped connecting arm viewed from the back shown in FIG. 2.
Figure 4:
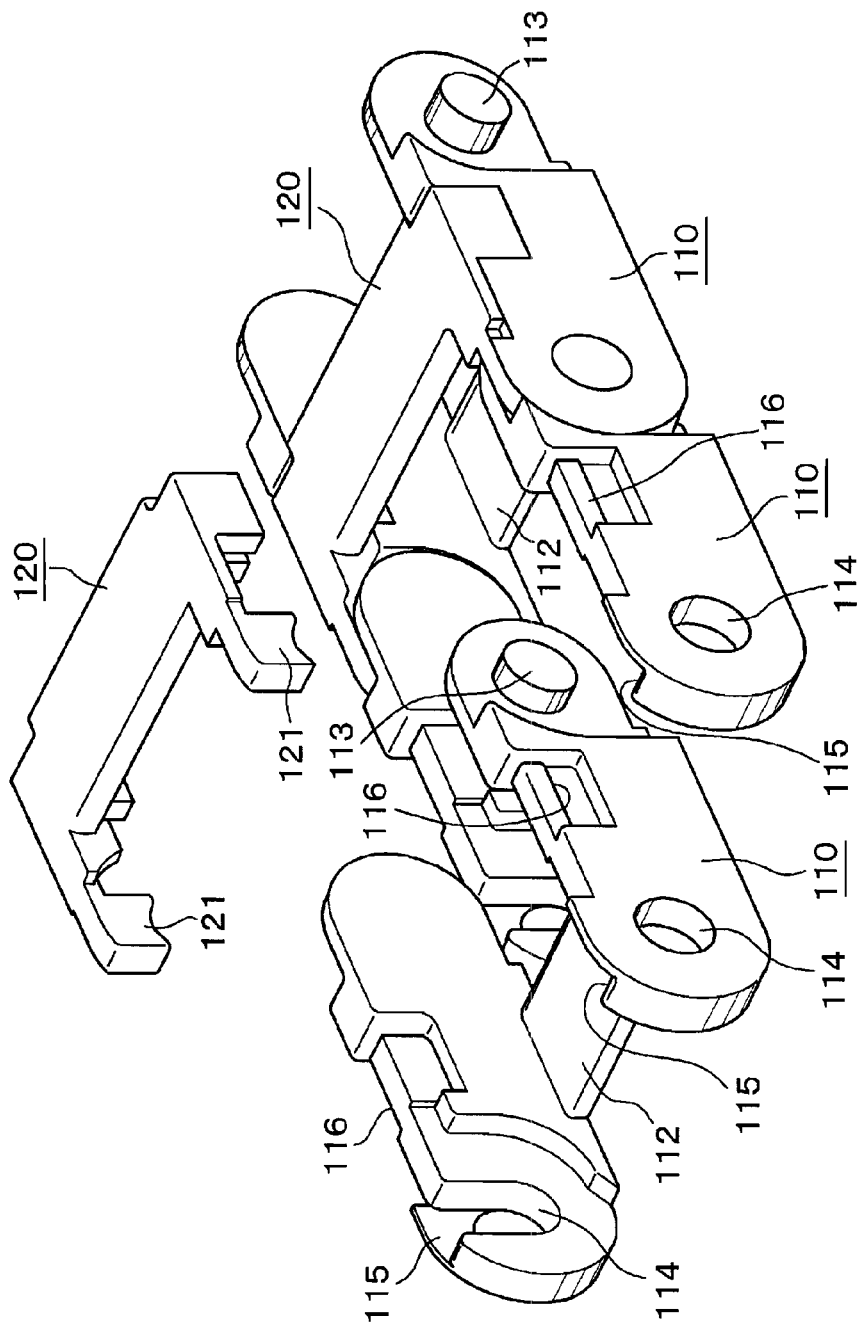
FIG. 4 is an assembly exploded view of the cable protection and guide device, which is the first example of the present invention.
Figure 5:
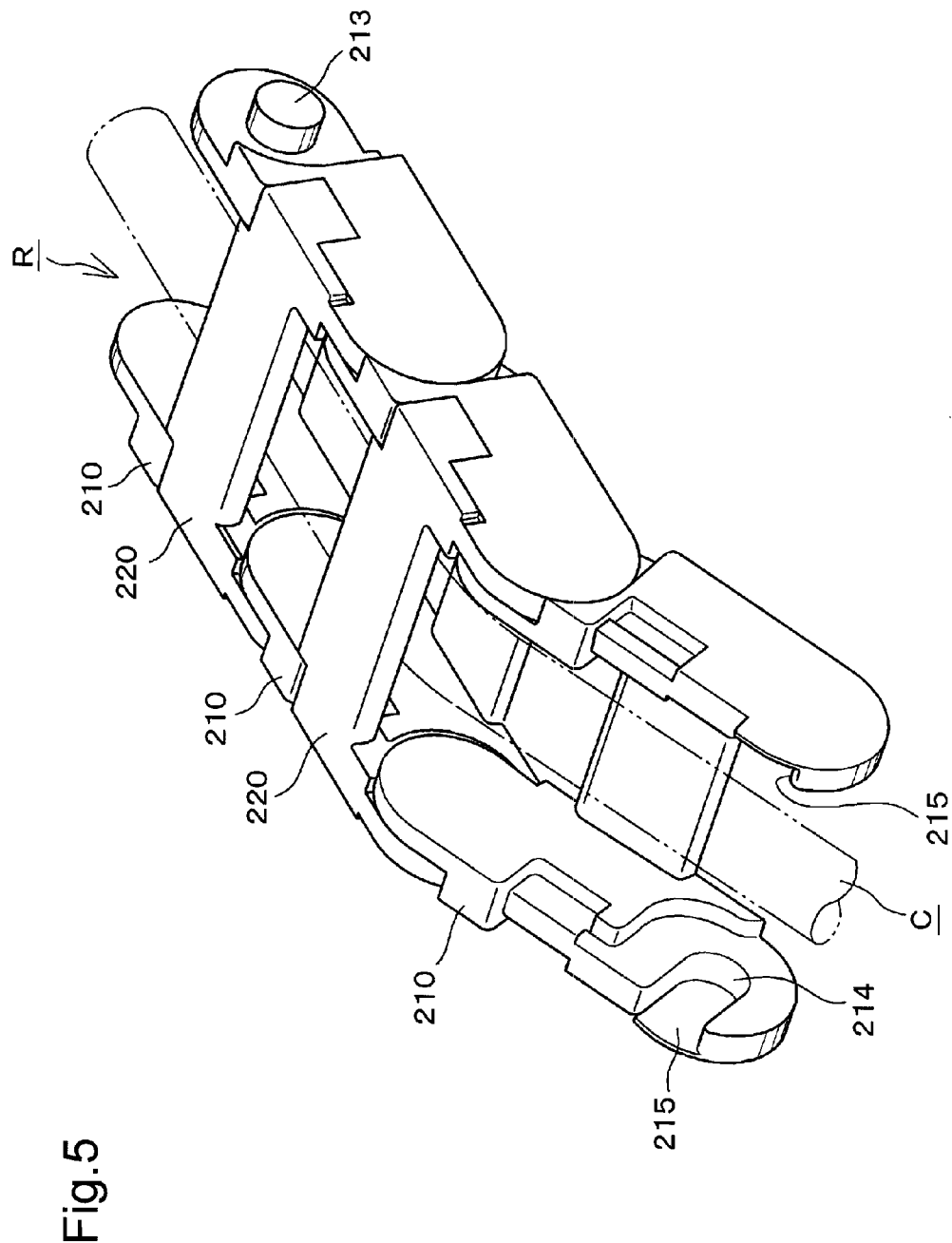
FIG. 5 is a perspective view of a cable protection and guide device, which is a second example of the present invention.
Figure 6:
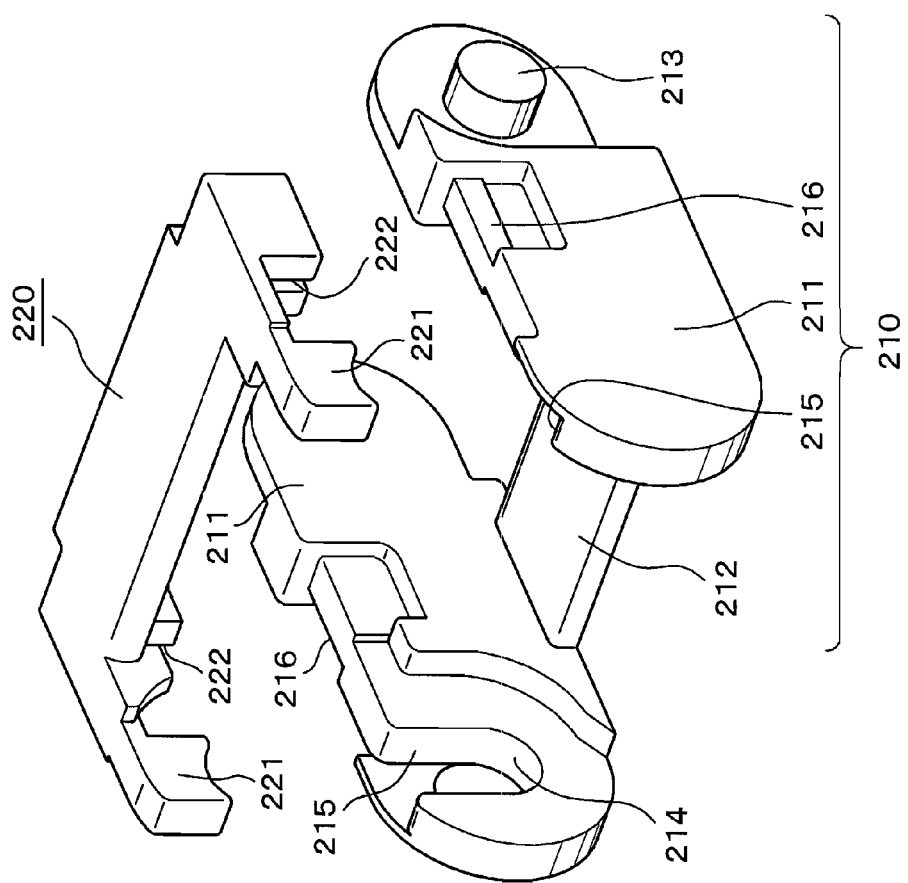
FIG. 6 is a perspective view of a link frame body and a lid-shaped connecting arm used in FIG. 5.
Figure 7:
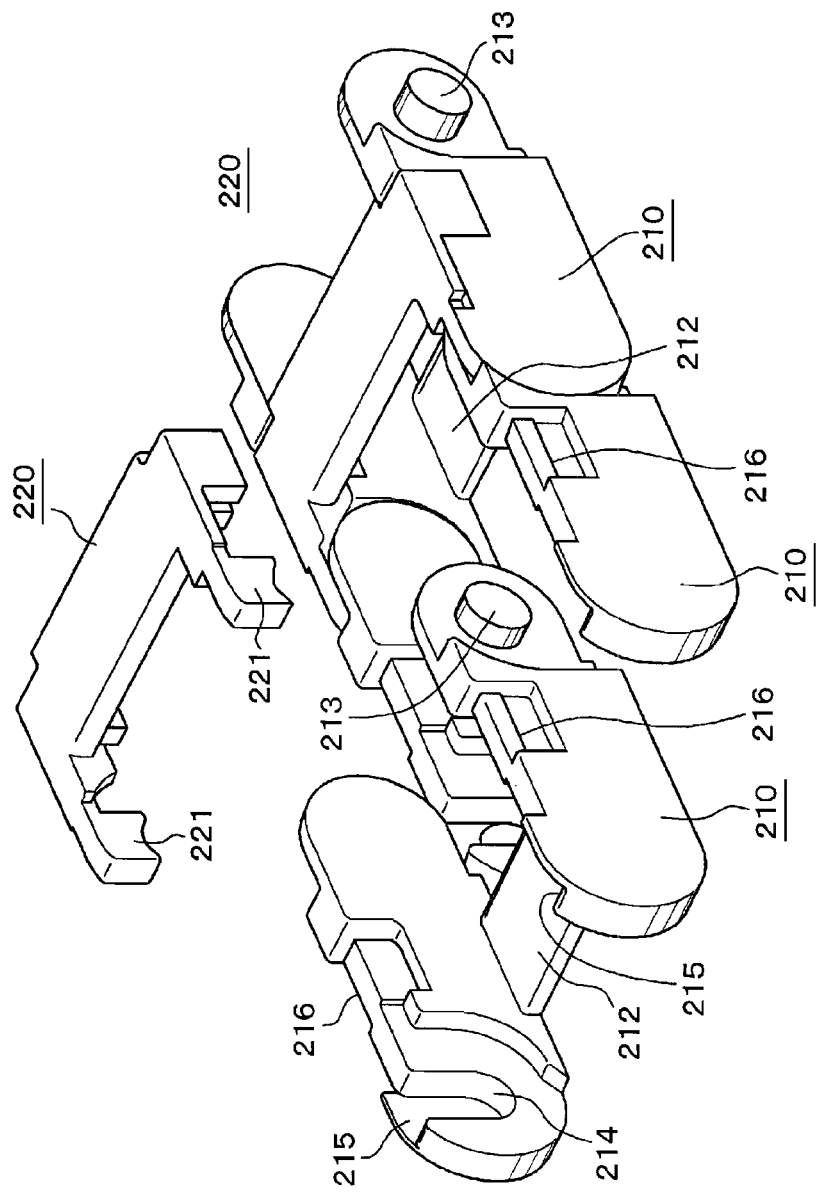
FIG. 7 is an assembly exploded view of the cable protection and guide device, which is the second example of the present invention.
Figure 8:
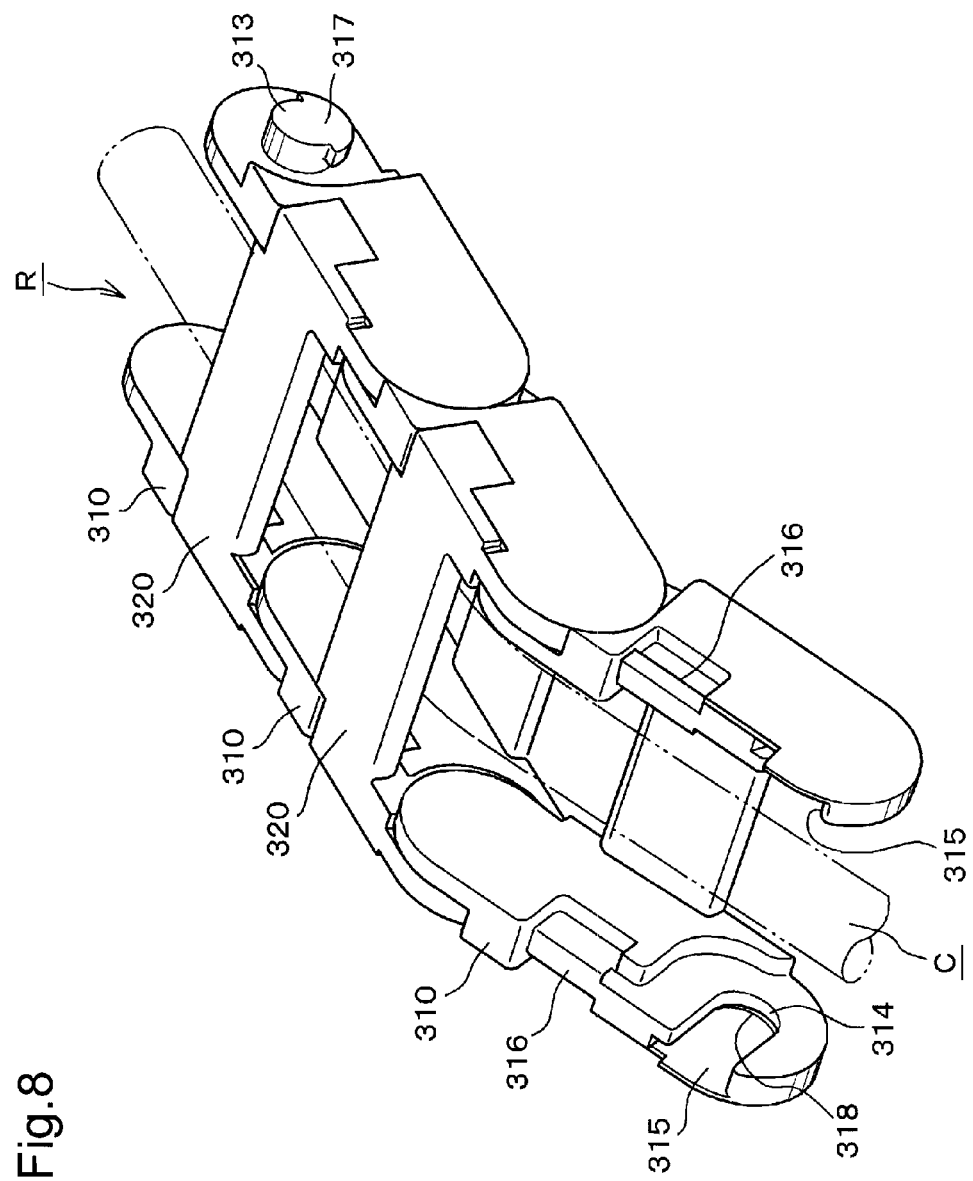
FIG. 8 is a perspective view of a cable protection and guide device, which is a third example of the present invention.
Figure 9:
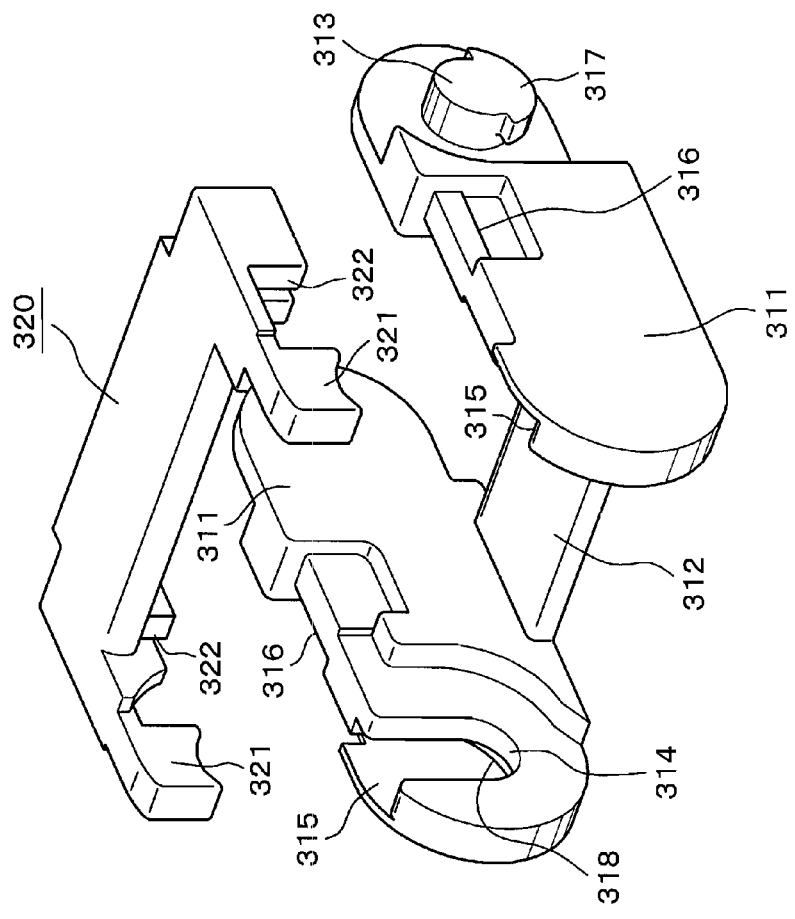
FIG. 9 is a perspective view of a link frame body and a lid-shaped connecting arm used in FIG. 8.
Figure 10:
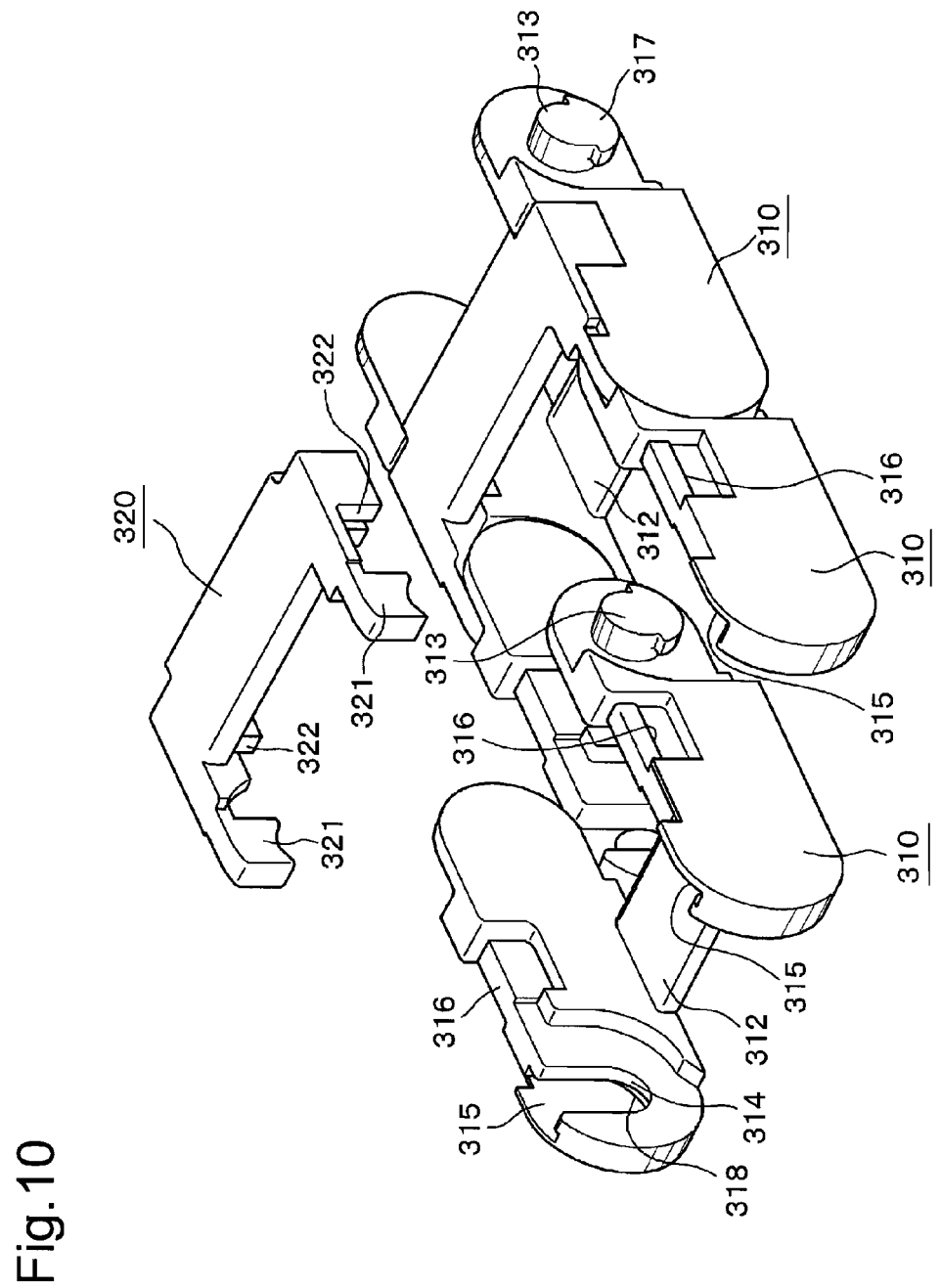
FIG. 10 is an assembly exploded view of the cable protection and guide device, which is the third example of the present invention.

First, FIG. 1 is a perspective view of the cable protection and guide device, which is a first example of the present invention. FIG. 2 is a perspective view of a link frame body and a lid-shaped connecting arm used in FIG. 1. FIG. 3 is a perspective view of the lid-shaped connecting arm viewed from the back shown in FIG. 2. FIG. 4 is an assembly exploded view of the cable protection and guide device, which is the first example of the present invention. FIG. 5 is a perspective view of a cable protection and guide device, which is a second example of the present invention. FIG. 6 is a perspective view of a link frame body and a lid-shaped connecting arm used in FIG. 5. FIG. 7 is an assembly exploded view of the cable protection and guide device, which is the second example of the present invention. Further, FIG. 8 is a perspective view of a cable protection and guide device, which is a third example of the present invention. FIG. 9 is a perspective view of a link frame body and a lid-shaped connecting arm used in FIG. 8. FIG. 10 is an assembly exploded view of the cable protection and guide device, which is the third example of the present invention.

A cable protection and guide device 100, which is the first example of the present invention and is shown in FIG. 1, is used for protecting and guiding a cable C such as an electric cable, which performs transmission of electric signals for connecting between a movable portion and a stationary portion in a plasma display, a semiconductor production device, a vehicle and supply electric power, and a hose for supplying oil pressure or pneumatic pressure.

The cable protection and guide device 100, which is the first example of the present invention, includes rectangular link frame bodies 110 each composed of a pair of right and left spaced link plates 111, 111 with an integrally molded bottom plate-shaped arm 112 on a flexional inner circumferential side of the link plates 111, 111 in a laterally bridged state. The link frame bodies are flexibly and sequentially connected to each other such that a connecting pin 113 of a preceding link plate 111 is inserted into a connecting pin hole 114 from a flexional outer circumferential side of the subsequent link plates 111. A cable C is inserted into a cable accommodating space R formed by a number of link plates, a number of lid-shaped connecting arms 120 each oppositely disposed to a number of bottom plate-shaped arm 112. The lid-shaped connecting arms 120 are detachably and sequentially attached to a flexional outer circumferential side of the pair of right and left link plates 111, 111 in a laterally bridged state.

As shown in FIG. 2, formed stepped portions in a plate width direction are formed on a front portion and a rear portion of the above-mentioned link plate 111. Thus the link plate 111 assumes a so-called off-set structure. Further, the rear portion of the link plate 111 is provided with a connecting pin 113 and the front portion of the link plate 111 is provided with a connecting pin hole 114 having substantially the same diameter as the connecting pin 113.

In such a manner, these adjacent link frame bodies 110, 110 are connected to each other by fitting the connecting pin 113 into the connecting pin hole 114 of the link plates adjacently disposed to each other so that they are rotatable about the connecting pin 113.

It is noted that the above-mentioned rectangular link frame body 110 and the lid-shaped connecting arm 120 are molded by a glass fiber reinforced polyamide resin which exhibits excellent strength properties.

A cutout opening portion 115 formed on the link plate 111 for inserting the connecting pin 113 into the connecting pin hole 114. A filling member 121, which seals this cutout opening portion 115 in the cable protection and guide device 100, which is the first example of the present invention, will be described based on FIGS. 2 to 4 in detail.

Cutout opening portion 115 communicates with connecting pin hole 114 from a flexional outer circumferential side of the link plate 111 toward the connecting pin hole 114 as shown in FIG. 2.

Further, as shown in FIG. 3, the above-mentioned lid-shaped connecting arm 120 includes integrally formed filling members 121 for sealing a connecting pin 113 inserted through the cutout opening portions 115. The connecting arm 120 also includes integrally formed locking concave portions 122 which detachably engage with engagement convex portions 116 from a flexional outer circumferential side toward a flexional inner circumferential side in a sandwiching state. The engagement convex portions 116 are formed on the outer circumferential side of the link plates 111.

In summary, the locking concave portion 122 of the lid-shaped connecting arm 120 has a snap mechanism, which detachably/attachably engages with the engagement convex portions 116 of the link plates 111 in a sandwiching state.

Assembling and disassembling steps of the cable protection and guide device 100, which is the first example of the present invention, are as follows. First as shown in FIG. 4, connecting pins 113 formed on link plates 111 of a preceding link frame body 110 are inserted into connecting pin holes 114 from a flexional outer circumferential side of link plates 111 of the subsequent link frame body 110 so that adjacent link frame bodies 110, 110 are connected to each other. Thus a number of connected link frame bodies 110 are connected together to form the device. A cable C is inserted into a cable accommodating space R formed by the number of connected link frame bodies 110, the lid-shaped connecting arms 120 mounted on pairs of right and left link plates 111, 111 and the bottom-plate shaped arms.

Next, when the cable protection and guide device 100, which is the first example of the present invention, is disassembled for maintenance, it is of course disassembled by reverse steps to the above-mentioned assembling steps.

According to the thus obtained cable protection and guide device 100, which is the first example of the present invention, as shown in FIGS. 1 to 4, the cutout opening portions 115 through which the connecting pins 113 are inserted into the connecting pin holes 114, communicate with the connecting pin holes 114. The filling members 121, which seal the connecting pin 113 cutout opening portions 115, are integrally formed with the lid-shaped connecting arm 120. Therefore, while the connecting pins 113 are inserted into the connecting pin holes 114, the cutout opening portions 115 which communicate with the connecting pin holes 114 are sealed with the filling members 121 of the lid-shaped connecting arm 120. Thus for example, when a connecting pin hole side inner width of a preceding link frame body 110 is smaller than a connecting pin side outer width of the subsequent link frame body 110 or even if the length of a connecting pin 113 is too long, connection of the link plates is easy. The easy connection is accomplished by sliding the connecting pins through the cutout opening portions of the link plates and then inserting the connecting pins into the connecting pin holes. This structure prevents the need to deform the link plates in order to make the connecting pins fit into the connecting pin holes. Since the link plates are not deformed during assembly of the parts, disengagement of the connecting pin 113 from the connecting pin hole 114 can be prevented.

Additionally, even if the link frame body 110 is miniaturized, since the connection assembly of both link frame bodies 110 and 110 is easy, the thickness of the link plate forming a link frame body is increased or the length of the connecting pin is increased so that partial reinforcement becomes possible and the tensile strength and deflection rigidity can be sufficiently ensured. Thus the effects of the first example of the present invention are very large.

Next, a cable protection and guide device 200 according to a second example of the present invention, shown in FIGS. 5 to 7, is different from the above-mentioned cable protection and guide device 100 in that a connecting pin hole 214 becomes a blind hole sealed at an outer surface side of a link plate 211, and the remaining device configurations are not different from each other at all.

It is noted that duplicated explanations of the device configurations of the cable protection and guide device 200 according to a second example of the present invention are omitted by changing the reference numerals of 100s denoted to the above-mentioned cable protection and guide device 100 to reference numerals of 200s.

Therefore since in the cable protection and guide device 200 according to a second example of the present invention, a connecting pin hole 214 is a blind hole sealed on an outer surface side of a link plate. In addition to the effects obtained by the above-mentioned cable protection and guide device 100, the entry of foreign substances such as dust into the connecting pin hole 214 and the residence therein can be blocked. Thus the connecting pin 213 becomes rotatable in the connecting pin hole 214 so that a smooth flexional operation of both link frame bodies 210, 210 can be attained. Thus the effects of the second example of the present invention are very large.

Further, a cable protection and guide device 300 according to a third example of the present invention shown in FIGS. 8 to 10, is different from the above-mentioned cable protection and guide device 100 in that a connecting pin hole 314 becomes a blind hole sealed at an outer surface side of a link plate 311. A disengagement prevention flange portion 317 is protrudently provided at a front end of a connecting pin 313. Disengagement prevention flange portion 317 is engaged with a disengagement prevention groove portion 318 circumferentially provided along the connecting pin hole 314. The remaining device configurations are not different from each other at all. It is noted that duplicated concrete explanations of the device configurations of the cable protection and guide device 300 according to a third example of the present invention are omitted by changing the reference numerals of 200s denoted to the above-mentioned cable protection and guide device 200 to reference numerals of 300s.

The cable protection and guide device 300 according to the third example includes a disengagement prevention flange portion 317 protrudently provided at a front end of a connecting pin 313. Disengagement prevention flange portion 317 is engaged with a disengagement prevention groove portion 318 circumferentially provided along the connecting pin hole 314. In addition to the effects obtained by the above-mentioned cable protection and guide device 100 or the cable protection and guide device 200, a strong disengagement prevention mechanism is formed by a disengagement prevention flange portion 317 and a disengagement prevention groove portion 318. Thus even if excessive tension and bending are generated in both link frame bodies 310, 310 during operation of the device, the disengagement of the connecting pin 313 from the connecting pin hole 314 can be completely prevented. Thus the effects of the third example of the present invention are very large.

DESCRIPTION OF REFERENCE NUMERALS 100, 200, 300 . . . Cable protection and guide device
110, 210, 310 . . . Link frame body
111, 211, 311 . . . Link plate
112, 212, 312 . . . Bottom plate-shaped arm
113, 213, 313 . . . Connecting pin
114, 214, 314 . . . Connecting pin hole
115, 215, 315 . . . Cutout opening portion
116, 216, 316 . . . Engagement convex portion
317 . . . Disengagement prevention flange portion
318 . . . Disengagement prevention groove portion
120, 220, 320 . . . Lid-shaped connecting arm
121, 221, 321 . . . Filling member
122, 222, 322 . . . Locking concave portion
C . . . Cable
R . . . Cable accommodating space Those skilled in the art will readily recognize that the invention has been set forth by way of example only and that changes may be made to the invention without departing from the spirit and the scope of the claimed invention.

The invention claimed is:

1. A cable protection and guide device comprising: a number of pairs of right and left spaced link frame bodies; each of said link frame bodies includes a pair of right and left spaced link plates; said link plates are articulately connected to each other in a longitudinal direction enabling said link plates to form a flexional circumferential bend having a flexional inner circumferential side and a flexional outer circumferential side; each of said link plates includes a flexional inner circumferential side residing during bending on said flexional inner circumferential side of said bend; each of said link plates includes an outer circumferential side residing during bending on said outer flexional circumferential side of said bend; each pair of said right and left spaced link plates includes an integrally molded bottom plate-shaped arm on said flexional inner circumferential side of said link plates in a laterally bridged state; each pair of said right and left spaced link plates are flexibly and sequentially connected to each other; each of said link plates includes a connecting pin; each of said link plates includes a connecting pin hole; said connecting pin of a preceding link plate resides partially in a connecting pin hole of a subsequent link plate; each of said link frame bodies includes a lid-shaped connecting arm; said lid shaped connecting arm disposed opposite said bottom plate-shaped arm; said lid-shaped connecting arm is detachably connected to said flexional outer circumferential side of said link plates in a laterally bridged state; a cable is inserted into a cable accommodating space formed by said link plates, said bottom plate-shaped arms, and said lid-shaped connecting arms so that said cable is protected and guided; each of said link plates includes a U-shaped cutout portion; each of said lid-shaped connecting arms includes an integrally formed filling member; said filling member includes an interior arc-shaped portion; said arc-shaped portion of said filling member resides in said U-shaped cutout portion; said arc-shaped portion and said U-shaped cutout portion in combination form a cylindrically shaped through-hole in said link plate; said cylindrically shaped through-hole in said link plate being aligned with said connecting pin hole; said connecting pin residing partially in said connecting pin hole and partially in said cylindrically shaped through-hole in said link plate.

2. A cable protection and guide device according to claim 1, wherein: said connecting pin includes a front end; said front end of said connecting pin includes a disengagement prevention flange portion; said connecting pin hole includes a circumferential disengagement prevention groove portion; and, said disengagement prevention flange portion of said pin is engaged with said circumferential disengagement prevention groove portion.

3. A cable protection and guide device comprising: a number of pairs of right and left spaced link frame bodies; each of said link frame bodies includes a pair of right and left spaced link plates; each of said right and left link plates include a wall; said link plates are articulately connected to each other in a longitudinal direction enabling said link plates to form a flexional circumferential bend having a flexional inner circumferential side and a flexional outer circumferential side; each of said link plates includes a flexional inner circumferential side residing during bending on said flexional inner circumferential side of said bend; each of said link plates includes an outer circumferential side residing during bending on said outer flexional circumferential side of said bend; each pair of said right and left spaced link plates includes an integrally molded bottom plate-shaped arm on said flexional inner circumferential side of said link plates in a laterally bridged state; each pair of said right and left spaced link plates are flexibly and sequentially connected to each other; each of said link plates includes a connecting pin; each wall of said link plates includes a U-shaped cutout portion; each of said link frame bodies includes a lid-shaped connecting arm; said lid shaped connecting arm disposed opposite said bottom plate-shaped arm; said lid-shaped connecting arm is detachably connected to said flexional outer circumferential side of said link plates in a laterally bridged state; a cable is inserted into a cable accommodating space formed by said link plates, said bottom plate-shaped arms, and said lid-shaped connecting arms so that said cable is protected and guided; each of said lid-shaped connecting arms includes an integrally formed filling member; said filling member includes an interior arc-shaped portion; said arc-shaped portion of said filling member resides in said U-shaped cutout portion of said wall of said link plate; said arc-shaped portion and said U-shaped cutout portion in said wall of said link plate, in combination, form a cylindrically shaped aperture terminating in said wall of said link plate; said connecting pin of a preceding link plate resides in said cylindrically shaped aperture in a subsequent link plate.

4. A cable protection and guide device according to claim 3, wherein: said connecting pin includes a front end; said front end of said connecting pin includes a disengagement prevention flange portion; said wall of said link plate includes a circumferential disengagement prevention groove portion; and, said disengagement prevention flange portion of said pin is engaged with said circumferential disengagement prevention groove portion.

\* \* \* \* \*